United States Patent

Hernandez et al.

[11] Patent Number: 5,988,131
[45] Date of Patent: *Nov. 23, 1999

[54] AIR INTAKE SYSTEM WITH COMPOSITE THROTTLE BODY

[75] Inventors: Edward Charles Hernandez, Canton; Jill Lynn Redmon, Chelsea; Susan Eunwon Song, Ann Arbor, all of Mich.

[73] Assignee: Ford Global Technologies, Inc., Dearborn, Mich.

[*] Notice: This patent is subject to a terminal disclaimer.

[21] Appl. No.: 08/997,414

[22] Filed: Dec. 23, 1997

[51] Int. Cl.⁶ ...................................................... F02D 9/00
[52] U.S. Cl. .................. 123/184.21; 123/184.61; 123/337; 251/305; 285/921
[58] Field of Search ................. 123/184.21, 184.61, 123/337; 251/305; 285/921

[56] References Cited

U.S. PATENT DOCUMENTS

| | | |
|---|---|---|
| 2,333,496 | 11/1943 | Townhill et al. . |
| 2,643,581 | 6/1953 | Wehrenfennig . |
| 3,159,180 | 12/1964 | Courtot et al. . |
| 3,468,565 | 9/1969 | Roder . |
| 4,449,737 | 5/1984 | Specht . |
| 4,805,564 | 2/1989 | Hudson, Jr. . |
| 4,960,153 | 10/1990 | Bergsma . |
| 5,035,214 | 7/1991 | Daly et al. ............................. 251/306 |
| 5,150,735 | 9/1992 | Bandy et al. . |
| 5,158,045 | 10/1992 | Arthur et al. . |
| 5,188,078 | 2/1993 | Tamaki .............................. 123/184.61 |
| 5,219,185 | 6/1993 | Oddenino ............................... 285/187 |
| 5,341,773 | 8/1994 | Schulte et al. . |
| 5,555,929 | 9/1996 | Ishikawa . |
| 5,575,250 | 11/1996 | Van Dyne, II . |
| 5,596,961 | 1/1997 | Faber . |
| 5,666,988 | 9/1997 | Becker ....................................... 137/15 |
| 5,692,470 | 12/1997 | Sattler et al. ............................ 123/337 |
| 5,722,357 | 3/1998 | Choi ......................................... 123/590 |
| 5,758,614 | 6/1998 | Choi ......................................... 123/590 |
| 5,878,715 | 3/1999 | Hernandez et al. ..................... 123/337 |

FOREIGN PATENT DOCUMENTS 0 554 096 A1  1/1993  European Pat. Off. .

*Primary Examiner*—Noah P. Kamen
*Assistant Examiner*—Hai Huynh
*Attorney, Agent, or Firm*—Donald A. Wilkinson

[57] ABSTRACT

An air intake system for an internal combustion engine. The air intake system includes an intake manifold (24) with a throttle body (22) mounted thereto. The intake manifold (24) and throttle body housing (26) are both formed primarily from a plastic or composite material. A snap-fit joint secures the throttle body (22) to the intake manifold (24). The joint includes a pair of mounting flanges (46,48), with the throttle body flange (46) including a set of lugs (54), and the manifold flange (48) including cutouts (56) and ramps (58) for receiving the lugs (54). The throttle body flange (46) also includes a loop hook (76) and gasket (52), which mate, respectively, with retention surfaces (84) and a sealing surface (70) on the manifold flange (48). The throttle body (22) also includes a main bore extension (62) with pilots (66) that mate with an entrance region (68) in the manifold (24).

19 Claims, 5 Drawing Sheets

AIR INTAKE SYSTEM WITH COMPOSITE THROTTLE BODY

FIELD OF THE INVENTION

The present invention relates to air intake systems for vehicle internal combustion engines, and more particularly to throttle bodies and manifolds used to control the intake air flow. This patent application is related to a patent application titled THROTTLE BODY WITH INTAKE MANIFOLD SNAP-FIT ATTACHMENT, filed herewith.

BACKGROUND OF THE INVENTION

Conventional throttle bodies and intake manifolds are formed from metals, such as aluminum or steel. They are typically attached to the inlet of an air intake manifold, in a cantilever fashion, by bolts. The bolts, then, support the entire weight of the throttle body. The sealing, of course, is accomplished in a conventional fashion with a flat gasket mounted between the throttle body and intake manifold. These components have been desirable because they are strong and provide accurate flow metering without leaks.

The conventional metal components used within an air intake system, however, are heavier and costlier than desirable. Consequently, with requirements for reduced weight and improved performance of vehicle engines, a desire exists to form more engine components from plastic and/or composite materials. Also, with an emphasis on cost, it is desirable to reduce the number of parts needed to form an assembly and to reduce the service costs by minimizing the time and tools needed for servicing. While plastic and composite intake manifolds are starting to come into use, plastic and composite throttle bodies are not commonly used. The reason is that there are some drawbacks to using these alternative materials over conventional metal components. One drawback is that it is difficult to maintain a long term sealing load on the gasket when using threaded fasteners without the use of metal inserts for receiving the fasteners. While this can be made to work, metal inserts add to the cost and complexity of the molding process. Also, the plastics and composites are generally not as strong as the conventional metals, which must support the assembly adequately. Further, for throttle bodies generally, the dimensional tolerances must be held very tight in order to obtain an accurate amount of desired air flow during engine operation. In order to do this, it is preferable to use a low creep material that is dimensionally stable and will maintain its dimensional tolerances under various humidity and temperature conditions. The conventional metal components have no difficulty achieving the desired results, but plastics and composites do not necessarily perform as well with these desirable characteristics.

Thus, is desirable to provide an intake assembly that improves weight, cost and complexity concerns as compared to conventional metal assemblies, but still adequately performs the air flow metering function of the conventional assemblies.

SUMMARY OF THE INVENTION

In its embodiments, the present invention contemplates an air intake assembly for use with a vehicle engine. The air intake assembly includes an intake manifold including a main bore, and a mounting flange surrounding the main bore. The intake assembly also includes a throttle body assembly including a throttle body housing having main bore and a mounting flange surrounding the main bore of the throttle body in alignment with the intake manifold main bore and mounting flange. The throttle body housing is formed from a composite thermoplastic material that is generally non-hydrophobic with water absorption rates less than about 1.5 percent and less dense than aluminum and steel. First mounting means, integral with the throttle body, secures the throttle body assembly to the intake manifold, and second mounting means, integral with the intake manifold, receives the first mounting means and secures the intake manifold to the throttle body.

Accordingly, an object of the present invention is to provide an air intake assembly having an intake manifold and throttle body that is lighter weight and less costly than metallic components, while still obtaining adequate functionality of the air intake flow control.

A further object of the present invention is to provide a new attachment strategy for attaching non-metallic throttle bodies to intake manifolds without employing conventional threaded fasteners, which will adequately support the throttle body that will be relatively simple to fabricate and will maintain adequate sealing between components, while also being easy to service.

An advantage of the present invention is a lower cost and lighter weight air intake assembly which is easy to service.

A further advantage of the present invention is that it will still maintain tight dimensional tolerances and will operate adequately over time by not creating concerns with creep of the material over time.

Another advantage of the present invention is that the throttle body can be formed of a material that will allow the throttle body and joint to maintain dimensional stability necessary for accurate operation under various humidity and temperature conditions.

An additional advantage of the present invention is the ease of serviceability of the assembly since only one portion of a part needs to flex, allowing the throttle body to be assembled and disassembled from the intake manifold with minimal tools.

DETAILED DESCRIPTION OF THE PREFERRED EMBODIMENTS

Figure 1:
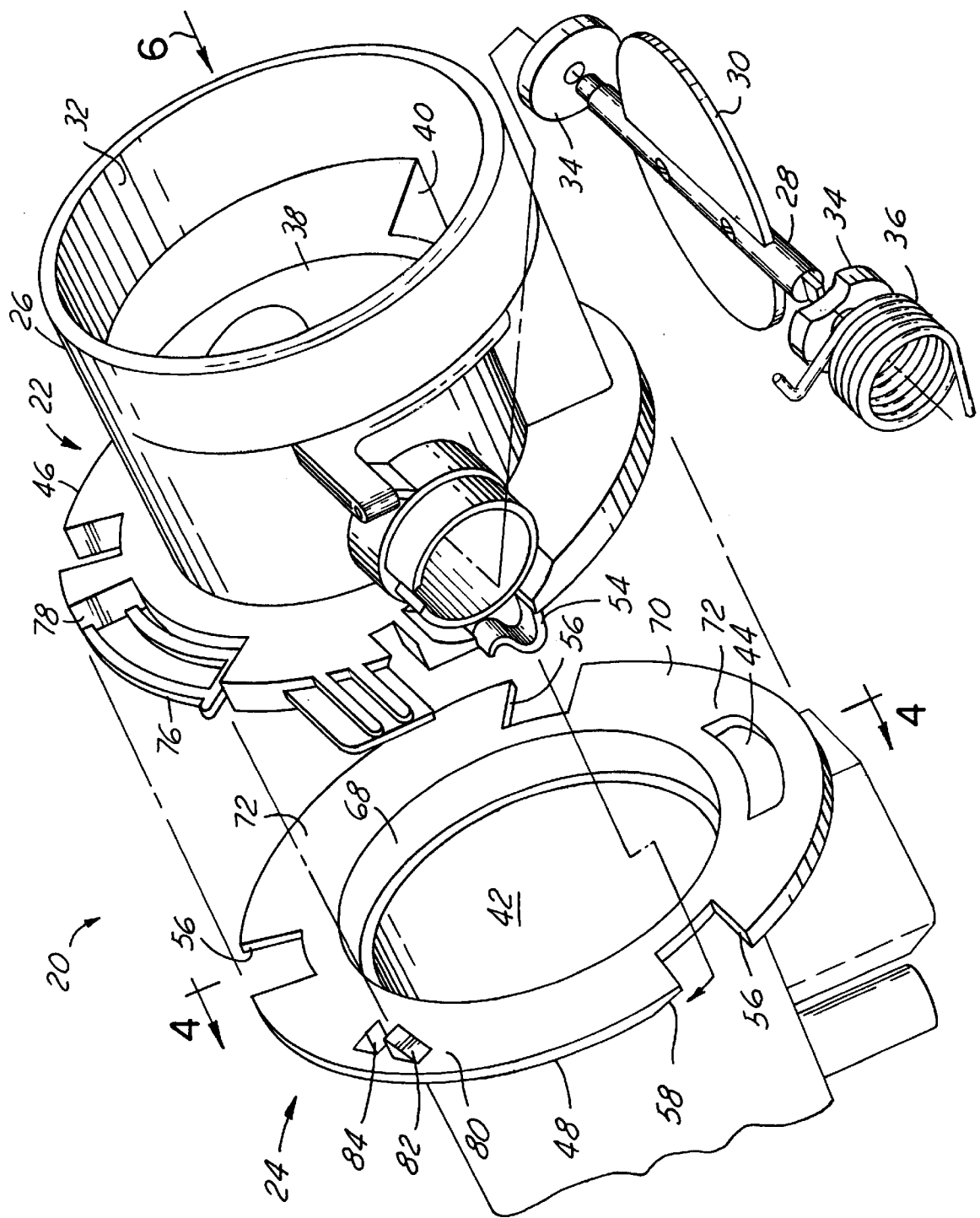
FIG. 1 is a partially exploded perspective view of a throttle body and a portion of an intake manifold in accordance with the present invention.
Figure 2:
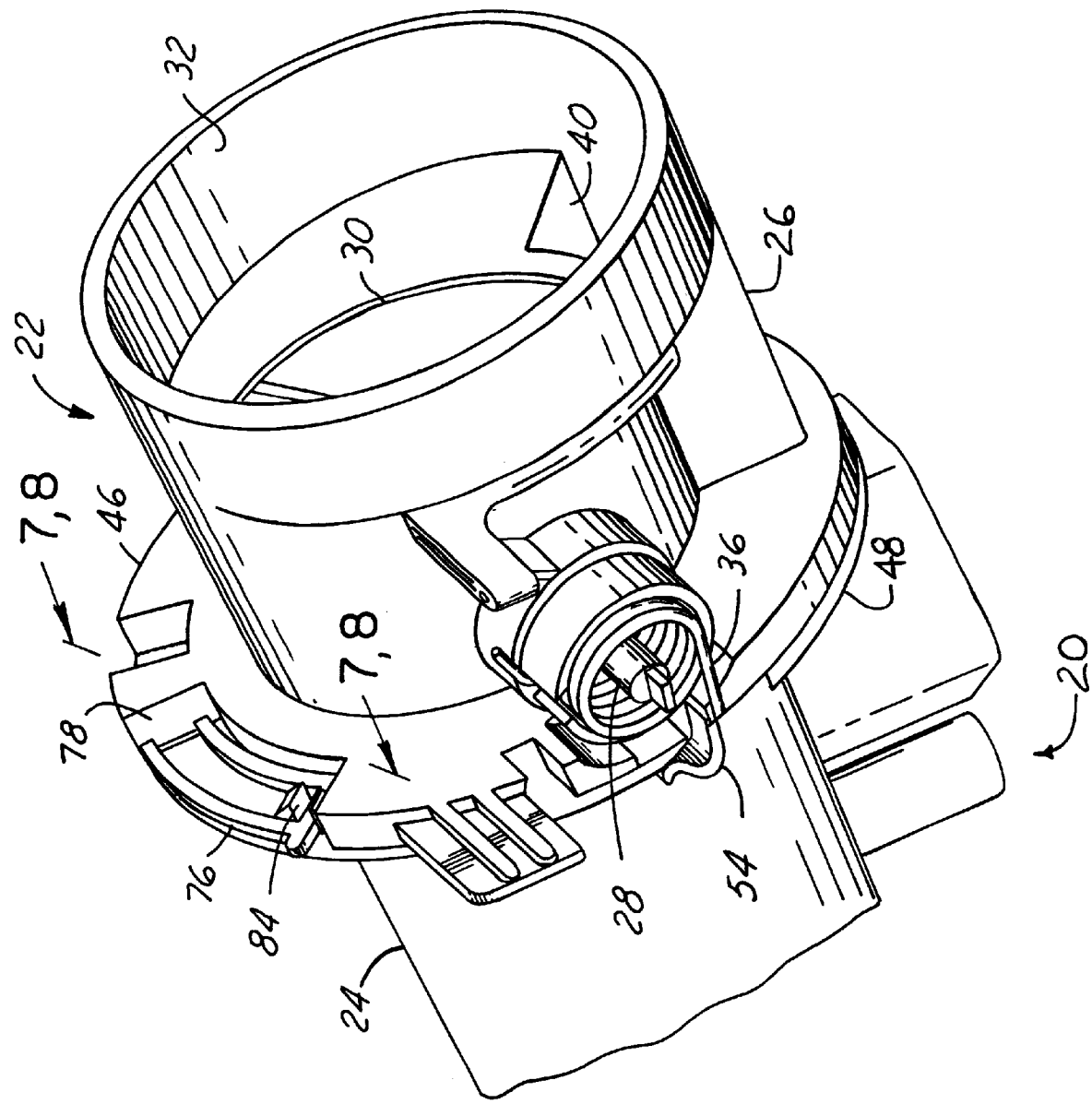
FIG. 2 is a perspective view similar to FIG. 1 illustrating the throttle body assembled to the intake manifold.
Figure 3:
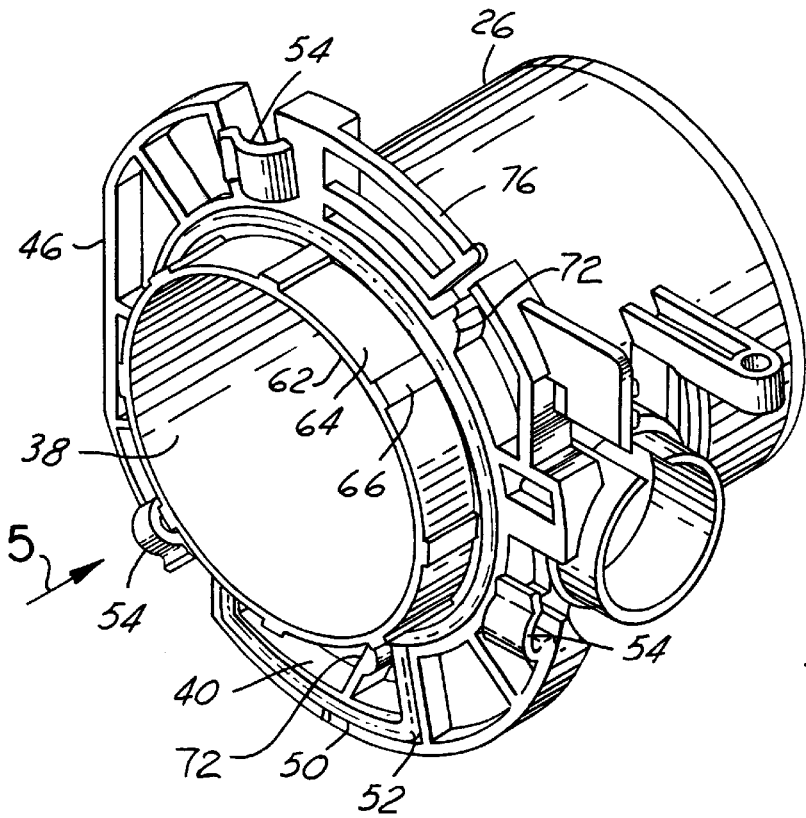
FIG. 3 is a perspective view of the throttle body housing in accordance with the present invention.
Figure 4:
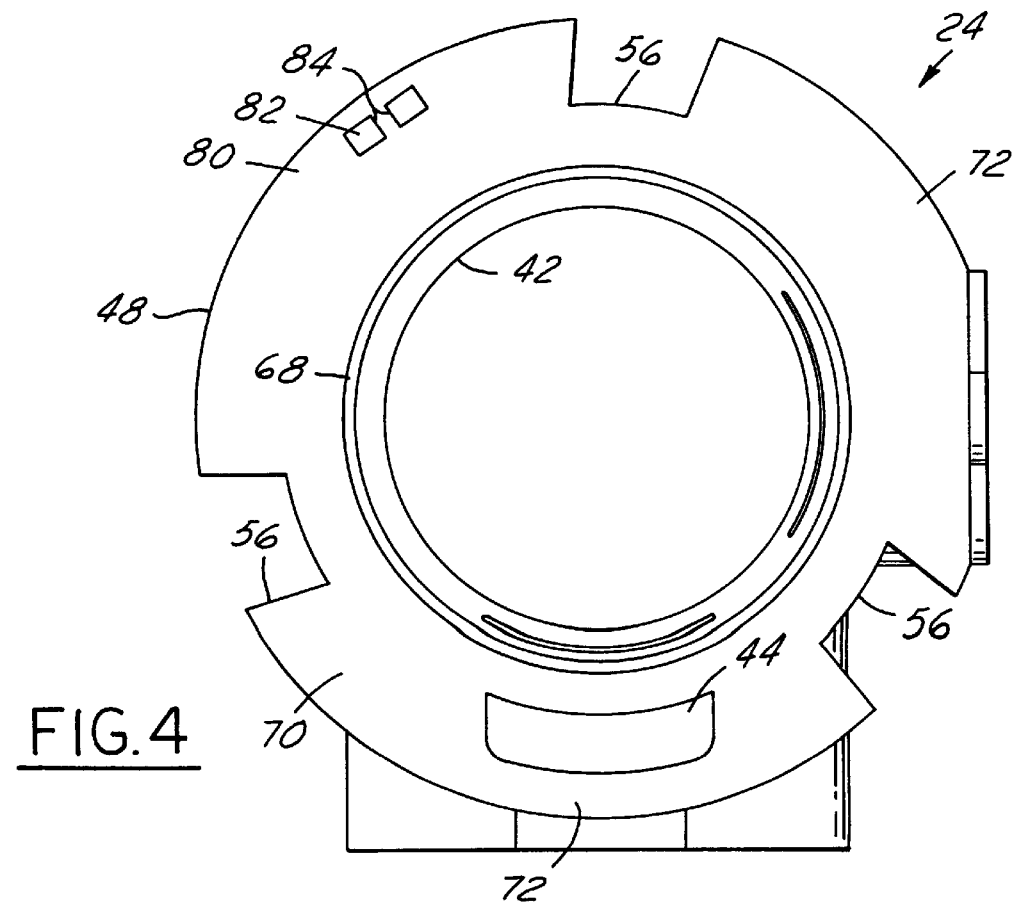
FIG. 4 is a side view of the intake manifold taken along line 4—4 in FIG. 1.
Figure 5:
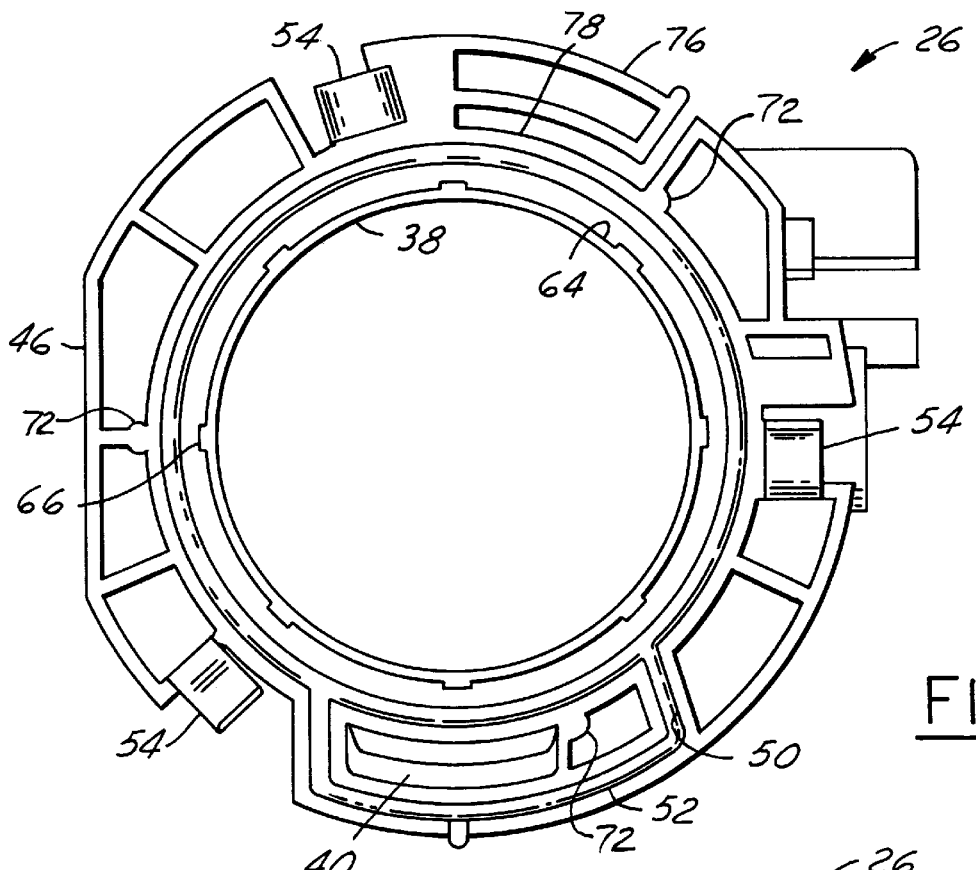
FIG. 5 is a side view of the throttle body taken along line 5 in FIG. 3.
Figure 6:
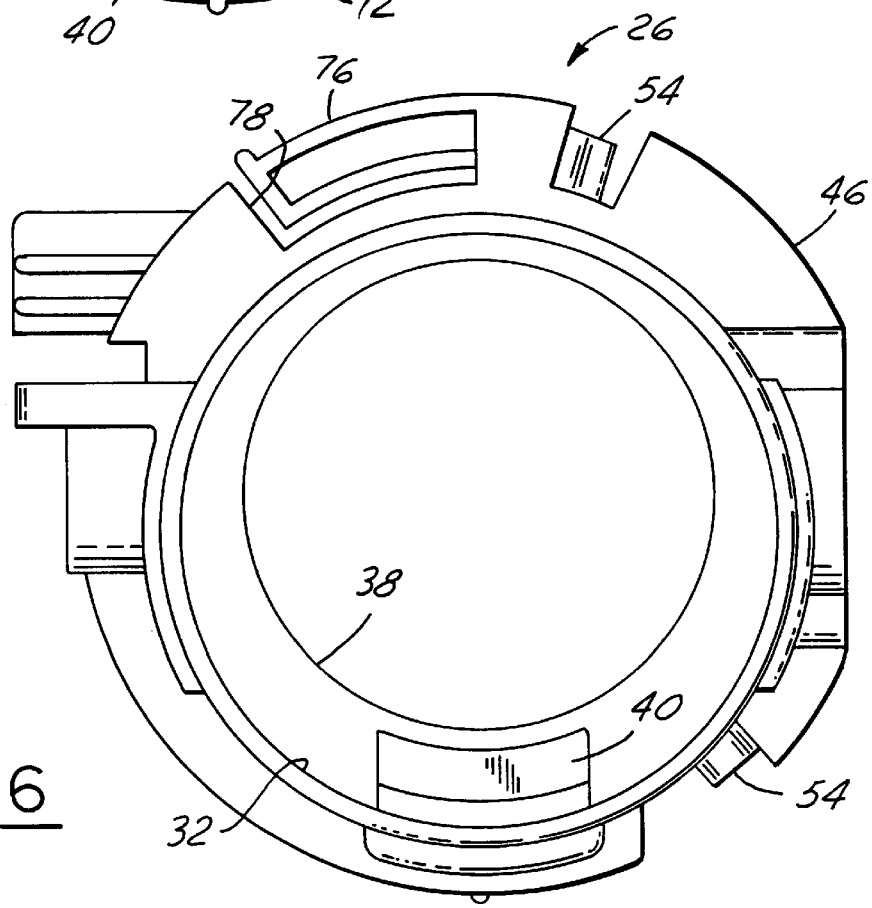
FIG. 6 is another side view of the throttle body taken along line 6 in FIG. 1.

An air intake assembly 20 includes a throttle body assembly 22, which connects to a composite intake manifold 24. The intake manifold 24 is preferably formed from a plastic composite such as glass filled nylon. The throttle body assembly 22 includes a composite throttle body housing 26 having a main bore 32. Within the main bore 32 a throttle shaft 28 and throttle plate 30 are mounted transversely via bearings 34. A torsion spring 36 biases the rotation of the throttle shaft 28 within the main bore 32.

The main bore 32 splits into two flow paths as it extends downstream through the throttle body housing 26. The first flow path is the continuation of a downstream portion 38 of the main bore 32 and the second flow path is a idle air bypass passage 40, which also extends through to the downstream end of the throttle body housing 26. The intake manifold includes a main bore 42 aligned with the downstream portion 38 of the throttle body main bore 32, and also an idle air bypass passage 44 which aligns with the throttle body idle air bypass passage 40.

In the throttle body 22, the throttle shaft 28 and plate 30 are mounted to selectively block flow through the downstream portion 38 of the main bore 32 by rotation of this assembly via conventional throttle control mechanisms, not shown. In order to allow for accurate control of the flow of air through the main bore 32 of the throttle body housing 26, the throttle plate 30 should seal precisely against the walls of the bore 38. Moreover, in maintaining this close seal, the plate 30 needs to move freely without sticking or binding against the walls of the downstream portion 38 of the main bore 32. Thus a dimensionally stable material is desirable for satisfactory operation of the assembly.

Consequently, one of the potential drawbacks of changing a throttle body housing from metal to plastic and/or composite generally is that many of the common plastics may not be as dimensionally stable as is desirable. Some will absorb moisture under high humidity conditions, causing the material to expand, which changes the dimensions of the bore 38 within which the throttle plate 30 is mounted. Further, some plastic and/or composite materials will expand or contract significantly under various temperature conditions, affecting the precision of the gap between the throttle plate and the main bore. This can reduce the precision of the relative position between the throttle plate and the bore.

In order to account for this, for the preferred embodiment of the present invention, the throttle body housing 26 is formed from a composite thermoplastic material having a high (e.g., greater than 40%) glass/mineral content, which can sustain continuous high temperatures of 125° C., is chemically resistant to common automotive fluids, is generally non-hydrophobic with water absorption rates less than about 1.5% (measured with the water absorption at 23° C. at 100% relative humidity), is dimensionally stable, and preferably lower cost and lighter than metals. Preferably, then, a material such as polybutylene terephthalate or polyphenylene sulfide is employed. By forming the throttle body housing 26 of these types of materials, it will minimize any changes in precision of air flow control when switching from a conventional metal material.

On the other hand, materials such as these tend to be somewhat brittle, which requires maintaining low strain rates on the throttle body housing 26 during assembly. It can also be difficult to control the profile/flatness of formed parts over broad surfaces, requiring limited zones/areas of tight tolerance requirements in order to minimize the cost of fabrication while not losing functionality. Thus, given a brittle material, one must stay within the molding limitations of the material and configure the mounting joint so as not to crack the material during assembly or during use, while still maintaining the integrity of the joint. Consequently, any joint employed to mount the throttle body assembly 22 from the intake manifold 24 needs to account for this.

Further, there is another potential drawback with employing plastic or composite material as opposed to conventional metal in that the material will generally have lower strength limits and will be much more susceptible to creep. Still further, with repair costs rising, any new joint is preferably quick and easy to assemble and disassemble with a minimum of tools.

The mounting of the throttle body 22 to the intake manifold 24 for the preferred embodiment of the present invention is achieved chiefly through a gasketed flange interface between the two components that includes four major elements; three lugs, a loop hook, a piloted surface and a gasket. For the mounting joint, both the throttle body housing 26 and the intake manifold 24 include flanges, 46 and 48 respectively. The throttle body flange 46 includes a recess 50 within its downstream face for receiving a gasket 52, which will act to seal between the two flanges 46,48.

The throttle body flange 46 also includes the three lugs 54 extending therefrom in a generally downstream direction. Although, other numbers of lugs can be used if so desired. The intake manifold flange 48 includes three cutouts 56, each corresponding to one of the three lugs 54. On the downstream side of the flange 48, adjacent each cutout are ramps 58.

The lugs 54 are shaped and sized so that they deflect, although minimally, during assembly of the throttle body 22 to the intake manifold 24. The lugs 54 are curved so that the open side of each lug 54 faces its corresponding ramp 58 on the intake manifold flange 48. As for the radii, length and thickness of this curved shape, it allows for adjustment in the design as needed to distribute the stresses along the length of each lug 54 in order to avoid overstressing them during assembly and engine operation. If desired, the backs of these lugs 54 can be gusseted to provide extra strength.

The ramps 58 are located adjacent cutouts 56 in the mounting flange 48 in order to allow the lugs 54 to easily slide initially onto the downstream side of the manifold flange 48 during assembly. The lugs 54 also include curls 60 opposite the main direction of curvature at their very ends to assure that during assembly the lugs 54 do not catch on the wrong (upstream) side of the manifold flange 48. Functionally, the lugs 54 and corresponding ramps 58 act as cams to pull and hold the two mounting flanges 46,48 together with the proper amount of pre-load and thereby compress the gasket 52 to assure a good seal.

By, in essence, overlapping the parts to mount them together, the sealing performance can still be maintained even as there may be some material creep over time. For throttle body housings 26 made of the preferred materials, the lug/ramp configuration thus accounts for the brittle nature of the material by allowing for minimal deformation of the lugs 54 as they cam-up on the ramps 58 while still providing sufficient clamping load so that creep will not become a concern.

The throttle body housing 26 also includes a main bore extension 62, which is a portion of the main bore 38, that extends downstream of the throttle body flange 46. It includes an outer generally cylindrical surface 64. On this outer surface are eight pilots 66, which are raised portions, extending radially outward from the outer surface 64. Each of the pilots 66 tapers radially inward as it extends downstream. These pilots 66 help to guide the throttle body housing 26 into an entrance region 68 of the intake manifold main bore 42. Preferably, the entrance region 68 also tapers the same amount and direction as the pilots 66 so they will have good surface area contact between them. Once in place, the pilots 66 will carry the radial loads associated with supporting the throttle body 22 cantilevered from the manifold 24, while also limiting the amount of mating surfaces on which tight tolerances are held. Here, only tight tolerances need to be held on the pilots 66 themselves to achieve proper alignment, not the entire surface 64.

The throttle body housing 26 additionally includes the gasket recess 50 within the downstream face of its flange 46 that not only extends all of the way around the main bore extension 62, but also around the idle air bypass passage 40 for complete sealing between the throttle body 22 and the intake manifold 24. The rubber gasket 52 fills the recess 50 and presses against a sealing surface 70, which is formed on the upstream face of the intake manifold flange 48. Also, for improved sealing, tolerance zones 72 are located generally mid-way between the lug cutouts 56 on the downstream face of the throttle body flange 46. These three zones 72 are held to close tolerances. The other areas will maintain good sealing due to their close proximity to the lugs 54 themselves. This arrangement eases manufacturing by requiring tight control of the tolerances only over the tolerance zones 72 and yet maintains a good seal all of the way around.

Further, the gasket 52 is shaped to avoid wiping on any voids in the sealing surface 70 of the intake manifold flange 48. This will help to avoid any leakage problems that could occur due to wear of the gasket 52. In particular, the gasket 52 extends circumferentially beyond the edge of the idle air bypass passage 44 to avoid wiping across it during assembly.

The composite throttle body housing 26 with a single gasket 52 sealing around all of its air flow paths allows for the idle air by-pass passage 40 to be molded integrally with the structure, thus minimizing parts and weight. Further, in today's engines, it is important to meter the intake air flow accurately. Any leakage in the air intake system will create an error in the measurement, thus limiting the precision of the engine operation.

With the lugs 54, pilots 66 and gasket 52 in place, the throttle body housing 26 is secured to the intake manifold 24 in all but the rotational direction. For this, the loop hook 76 acts as a locking feature, which assures that once installed, the throttle body 22 will remain in its proper mounted position relative to the manifold 24. The loop hook 76 is cantilevered from one edge of a cutout 78 in the throttle body flange 46 and oriented to extend along the downstream edge of the flange 46. The topology of the hook 76 is similar to a flat cantilevered beam with a hole near its free end. On the manifold flange 48 is a flat portion of an engagement surface 80, which is flat surface along which the loop hook 76 slides, and a ramped portion 82. Adjacent the engagement ramp 82 is a pair of retention surfaces 84. Since the loop hook 76 has a small depth dimension, the deflection occurs with minimal force and allows for just the small ramped surface 82 to minimize the deflection. This allows for a securing feature without overstraining a brittle material. Once in place, the loop hook 76 will support all loads in the rotational direction and prevent rotation from occurring.

Figure 7:
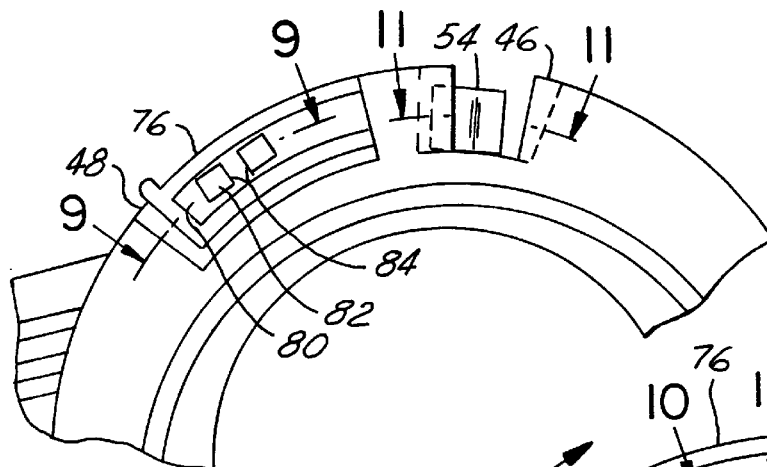
FIG. 7 is a side view taken along line 7—7 in FIG. 2, illustrating the throttle body partially mounted onto the intake manifold.
Figure 8:
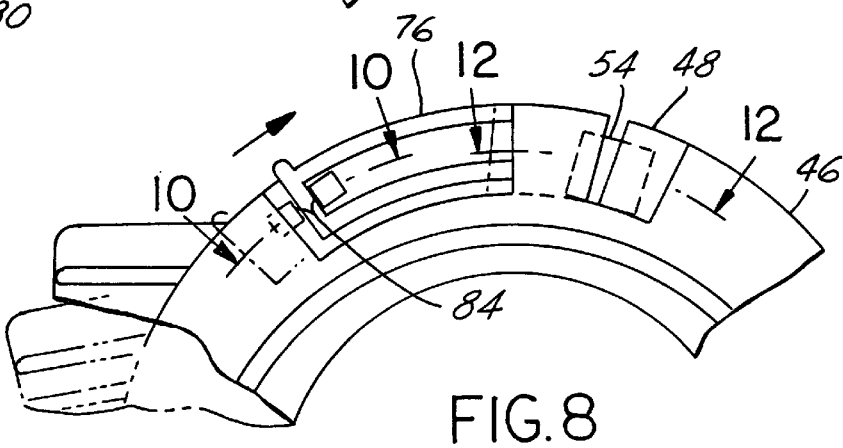
FIG. 8 is a side view similar to FIG. 7, taken along line 8—8 in FIG. 2, illustrating the throttle body fully mounted onto the intake manifold.
Figure 9:
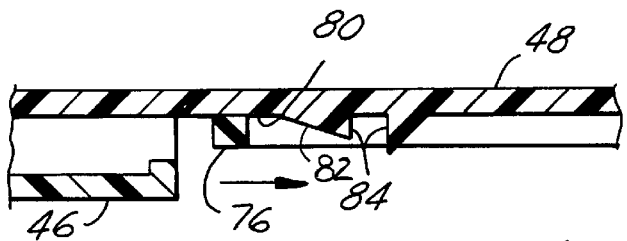
FIG. 9 is a sectional view taken along line 9—9 in FIG. 7.
Figure 10:
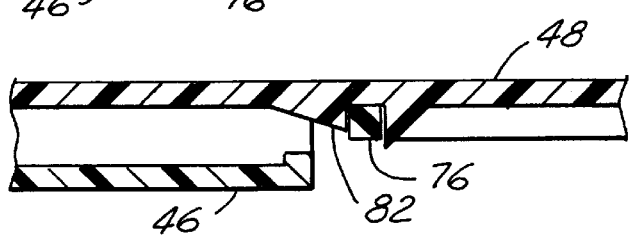
FIG. 10 is a sectional view taken along line 10—10 in FIG. 8.
Figure 11:
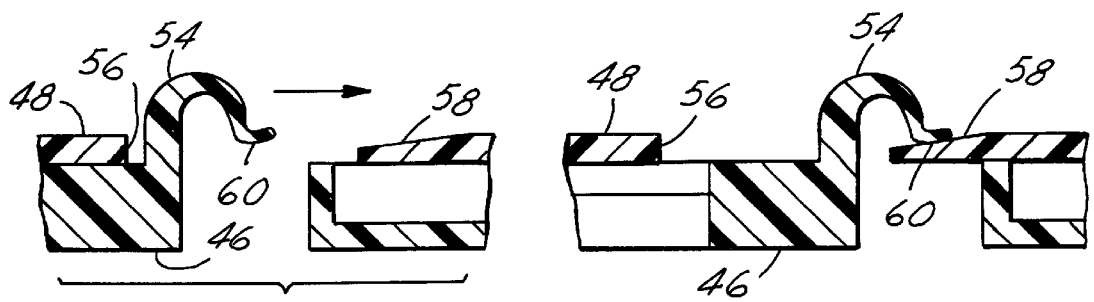
FIG. 11 is a sectional view taken along line 11—11 in FIG. 7.
Figure 12:
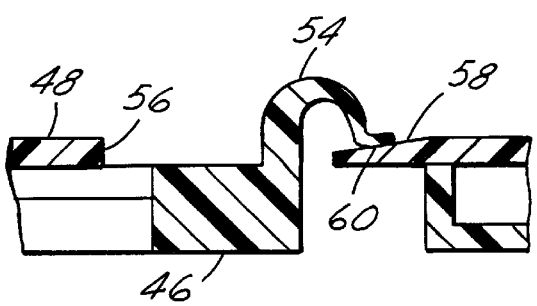
FIG. 12 is a sectional view taken along line 12—12 in FIG. 8.

The assembly process will now be described. FIG. 1 illustrates the air intake components prior to assembly. For this, one merely needs to align the loop hook 76 with the engagement surface 80 and each of the lugs 54 generally with its corresponding cutout 56. The lugs 54 are spaced around the throttle body flange 46 such that if a given lug 54 is aligned with a non-corresponding cutout 56, then the other lugs 54 will not align with an improper cutout 56. This assures that an improperly oriented assembly will not occur. At this point, the main bore extension 62 of the throttle body 22 is pushed into the entrance region 68 of the manifold main bore 42. As the one is pushed into the other, the pilots 66 will become engaged and assure the proper alignment of the bore 38 and the manifold main bore 42. The lugs 54 then will pass through the cutouts 56 and extend beyond the downstream surface of the manifold mounting flange 48 as the gasket 52 first contacts the sealing surface 70 of the manifold mounting flange 48. FIGS. 7, 9 and 11 illustrate the partial assembly after the push motion has occurred. The push motion does not require force sufficient to compress the gasket 52.

The next step for assembly is a twisting motion. The throttle body assembly 22 is now twisted about the centerline of the main bores relative to the intake manifold 24, which causes the lugs 54 to cam-up on the ramps 58, pulling the two closer together and compressing the gasket 52 to form a tight seal. The twisting continues until the loop hook 76 slides up the engagement ramp 82 and engages the retention surfaces 84, preventing any further rotational motion in either direction. The throttle body assembly 22 is now secured to the intake manifold 24 in the proper position. FIGS. 2, 8, 10 and 12 illustrate after the twist motion has occurred and the two are fully mounted relative to one another.

Should the need then arise to later remove the throttle body assembly 22 from the intake manifold 24 for repair or service, then one only needs to lift the loop hook 76 from the retention surfaces 84 while rotating the throttle body assembly 22 in the opposite direction of that used for assembly. Further, this can generally be done quite easily with no tools. Moreover, a strong sealed joint is formed that will allow for the use of a more brittle composite material for the throttle body housing 26, with the benefits of composite material over metals, without degradation of performance of the throttle body 22 relative to a metal one.

While certain embodiments of the present invention have been described in detail, those familiar with the art to which this invention relates will recognize various alternative designs and embodiments for practicing the invention as defined by the following claims.

We claim:

1. An air intake assembly for use with a vehicle engine comprising:

an intake manifold including a main bore, and a mounting flange surrounding the main bore;

a throttle body assembly including a throttle body housing having main bore and a mounting flange surrounding the main bore of the throttle body in alignment with the intake manifold main bore and mounting flange, and with the throttle body housing formed from a composite thermoplastic material that is generally non-hydrophobic with water absorption rates less than about 1.5 percent and less dense than aluminum and steel;

first mounting means, integral with the throttle body, for securing the throttle body assembly to the intake manifold; and second mounting means, integral with the intake manifold, for receiving the first mounting means and securing the intake manifold to the throttle body.

2. The air intake assembly of claim 1 wherein the throttle body housing is made of a composite material that can operate under sustained temperatures above 125° C.

3. The air intake assembly of claim 2 wherein the throttle body housing is made of a composite material that includes a glass content greater than about forty percent.

4. The air intake assembly of claim 3 wherein the throttle body housing is made of polybutylene terephthalate.

5. The air intake assembly of claim 3 wherein the throttle body housing is made of polyphenylene sulfide.

6. The air intake assembly of claim 1 wherein the throttle body housing is made of a composite material that includes a glass content greater than about forty percent.

7. The air intake assembly of claim 1 wherein the throttle body housing is made of polybutylene terephthalate.

8. The air intake assembly of claim 7 wherein the intake manifold is formed from a composite plastic material.

9. The air intake assembly of claim 1 wherein the intake manifold is formed from a composite plastic material.

10. The air intake assembly of claim 9 wherein the composite plastic material of the intake manifold is a glass filled nylon.

11. The air intake assembly of claim 1 wherein the intake manifold includes an idle air bypass passage integral therewith and the throttle body housing includes an idle air bypass passage integral therewith aligned with the intake manifold idle air bypass passage.

12. The air intake assembly of claim 11 wherein the throttle body mounting flange includes a gasket recess and a gasket mounted within the recess that fully surrounds the throttle body main bore and the throttle body idle air bypass passage.

13. The air intake assembly of claim 12 wherein the intake manifold is shaped such that the gasket does not extend across any discontinuities in the intake manifold flange during or after assembly of the throttle body to the intake manifold.

14. An air intake assembly for use with a vehicle engine comprising:

an intake manifold including a main bore, and a mounting flange surrounding the main bore;

a throttle body assembly including a throttle body housing having main bore and a mounting flange surrounding the main bore of the throttle body in alignment with the intake manifold main bore and mounting flange, and with the throttle body housing made of polybutylene terephthalate;

first mounting means, integral with the throttle body, for securing the throttle body assembly to the intake manifold; and second mounting means, integral with the intake manifold, for receiving the first mounting means and securing the intake manifold to the throttle body.

15. The air intake assembly of claim 14 wherein the composite plastic material of the intake manifold is a glass filled nylon.

16. The air intake assembly of claim 14 wherein the intake manifold includes an idle air bypass passage integral therewith and the throttle body housing includes an idle air bypass passage integral therewith aligned with the intake manifold idle air bypass passage.

17. A throttle body assembly for use with an intake manifold of an internal combustion engine comprising:

a throttle shaft and throttle plate mounted thereon;

a throttle body housing including a main bore within which the throttle shaft and the throttle plate are operatively mounted, with the main bore including an upstream end and a downstream end and a mounting flange surrounding the downstream end of the main bore with the mounting flange including means, integral with the mounting flange, adapted for mounting the throttle body housing to the intake manifold, and with the throttle body housing made of polyphenylene sulfide.

18. The throttle body of claim 17 wherein the intake manifold includes an idle air bypass passage integral therewith.

19. The throttle body of claim 18 wherein the throttle body mounting flange includes a gasket recess and a gasket mounted within the recess that fully surrounds the throttle body main bore and the throttle body idle air bypass passage.

* * * * *